(12) United States Patent
Stucchi et al.

(10) Patent No.: US 8,851,118 B2
(45) Date of Patent: Oct. 7, 2014

(54) SOLENOID VALVE

(75) Inventors: Sergio Stucchi, Orbassano (IT); Onofrio De Michele, Orbassano (IT); Raffaele Ricco, Orbassano (IT); Marcello Gargano, Orbassano (IT); Chiara Altamura, Orbassano (IT); Carlo Mazzarella, Orbassano (IT)

(73) Assignee: C.R.F. Societa Consortile per Azioni, Orbassano (Torino) (IT)

( * ) Notice: Subject to any disclaimer, the term of this patent is extended or adjusted under 35 U.S.C. 154(b) by 170 days.

(21) Appl. No.: 13/591,816

(22) Filed: Aug. 22, 2012

(65) Prior Publication Data

US 2013/0134337 A1     May 30, 2013

(30) Foreign Application Priority Data

Nov. 24, 2011  (EP) .................................. 11190645

(51) Int. Cl.
*F15B 13/043*     (2006.01)
(52) U.S. Cl.
USPC .................................................. 137/625.64

(58) Field of Classification Search
USPC ............... 137/630.14, 630.15, 630.19, 630.2, 137/630.21, 630.22
See application file for complete search history.

(56) References Cited

U.S. PATENT DOCUMENTS

| 4,723,575 A | 2/1988 | Kazita et al. |
| 5,918,630 A | 7/1999 | Lucas et al. |
| 6,748,977 B2 * | 6/2004 | Berto ........................... 137/628 |

OTHER PUBLICATIONS

European Search Report for EP Application No. 11190645, dated Apr. 19, 2012.

* cited by examiner

*Primary Examiner* — John K Fristoe, Jr.
*Assistant Examiner* — Kevin E Lynn
(74) *Attorney, Agent, or Firm* — Nixon & Vanderhye P.C.

(57) ABSTRACT

A solenoid valve comprises a first mouth for an inlet of a working fluid and a second mouth and a third mouth for an outlet of the working fluid. The valve has a first operating position in which a passage of fluid from the first mouth to the second mouth and the third mouth is enabled, a second operating position in which a passage of fluid from the first mouth to only one of the second and third mouths is enabled, and a third operating position in which the passage of fluid from the first to the second mouth and the third mouth is disabled.

16 Claims, 8 Drawing Sheets

SOLENOID VALVE

TEXT OF THE DESCRIPTION

This application claims priority to EP Application No. 11190645.9, filed 24 Nov. 2011, the entire contents of which is hereby incorporated by reference.

Field of the Invention

The present disclosure relates to a solenoid valve, in particular of the type comprising three mouths and three operating positions, wherein the three mouths comprise:
- a first mouth for inlet of a working fluid, in particular oil, and
- a second mouth and a third mouth for outlet of the working fluid, and wherein the three operating positions comprise:
- a first operating position in which a passage of fluid from the first mouth to the second and third mouths is enabled,
- a second operating position in which a passage of fluid from the first mouth to just one of the second and third mouths is enabled, and the passage of fluid between the second and third mouths is simultaneously disabled, and
- a third operating position in which the passage of fluid from the first mouth to the second and third mouths is disabled, wherein the solenoid valve further comprises an electromagnet that can be controlled for causing a switching of the operating position.

General Technical Problem

Numerous examples of valves with three mouths and three operating positions are known whereby a fluid communication between an inlet mouth and two outlet mouths is selectively set up in order to direct alternatively the fluid towards one of the aforesaid outlet mouths or to both of them.

In the present disclosure, the term "operating position" is intended to indicate a condition of operation of the solenoid valve in which assigned to one or more moving elements of the solenoid valve itself is a position that results, amongst other things, in a particular mode of connection of the operating mouths of the solenoid valve.

In general, the environments giving out into which are the inlet and outlet mouths have pressure values different from one another, where the maximum value of pressure impinges on the inlet mouth, whereas impinging on the outlet mouths are two different levels of pressure, which are both lower than the pressure that impinges on the inlet mouth. Switching of the solenoid valve can be exploited to modulate the level of pressure in a load connected to the inlet mouth.

However, the fact that the valve comes to work facing environments at different pressures and sometimes with marked pressure swings between them and markedly variable even in each environment, renders the dynamic behaviour of the valve difficult to control in so far as the moving elements present inside it are perturbed significantly by the pressure of the environments giving out into which are the operating mouths, and consequently their actuation will prove to be markedly conditioned by the levels of operating pressure.

In greater detail, the different levels of pressure of the environments connected to the mouths of the solenoid valve determine the modulus of the resultant of the pressure forces acting on the moving elements of the solenoid valve itself, in particular in the axial direction.

The electromagnet must consequently be sized in such a way as to be able to actuate the moving elements even when the resultant of the pressure forces assumes a maximum value. This represents the main design constraint since, as the maximum force required by the electromagnet for actuation of the moving elements increases, both the costs and the overall dimensions of the electromagnet itself increase. Nevertheless, this is accompanied with an increase of the switching times between the different operating positions of the solenoid valve, which can become at this point so long as to jeopardize the possibility of use of the solenoid valve in contexts where a high speed of response is required.

In fact, in various oleodynamic applications, it is necessary for a solenoid valve to guarantee not only processing of a certain flow of fluid, but also a response to the commands in extremely short times: today increasingly numerous are the applications in which response times in the region of milliseconds are required as against operating pressures in the region of several hundreds of bar.

OBJECT OF THE INVENTION

The object of the present invention is to provide a solenoid valve comprising three mouths and three operating positions that will be able to work in three environments at pressures that differ from one another and with marked pressure swings between them, where actuation of moving elements of the solenoid valve will be substantially irrespective of the levels of pressure in the environments connected to the mouths of the valve itself, and where moreover the solenoid valve will be able to process high flows of fluid and will be characterized by extremely contained switching times.

SUMMARY OF THE INVENTION

The object of the present invention is achieved by a solenoid valve having the characteristics forming the subject of the ensuing claims, which form an integral part of the technical teaching provided herein in relation to the invention.

In particular, the object of the invention is achieved by a solenoid valve having all the characteristics listed at the start of the present description and further characterized in that it comprises a first open/close element and a second open/close element, co-operating with a first contrast seat and a second contrast seat, respectively, wherein the first open/close element and the first contrast seat are provided for regulation of the passage of fluid from the first mouth to the third mouth, wherein the second open/close element and the second contrast seat are provided for controlling the passage of fluid from the first mouth to the second mouth, the solenoid valve being moreover characterized in that the electromagnet can be actuated for impressing on the second open/close element:
- a first movement whereby the second open/close element is brought into contact with the second contrast seat disabling the passage of fluid from the first mouth to the second mouth and providing a passage from the first operating position to the second operating position, and
- a second movement, subsequent to the first movement, whereby the second open/close element moves the first open/close element into contact against the first contrast seat, disabling the passage of fluid from the first mouth to the third mouth, hence enabling a passage from the second operating position to the third operating position, where, during the second movement, the second open/close element is in contact with the second contrast surface, and wherein moreover the first and second open/close elements are coaxial to one another and hydraulically balanced.

BRIEF DESCRIPTION OF THE FIGURES

The invention will now be described with reference to the annexed figures, which are provided purely by way of non-limiting example and in which.

DETAILED DESCRIPTION OF THE INVENTION

With reference to FIG. 1, the reference number 1 designates as a whole a solenoid valve according to a preferred embodiment of the invention.

Figure 1A:
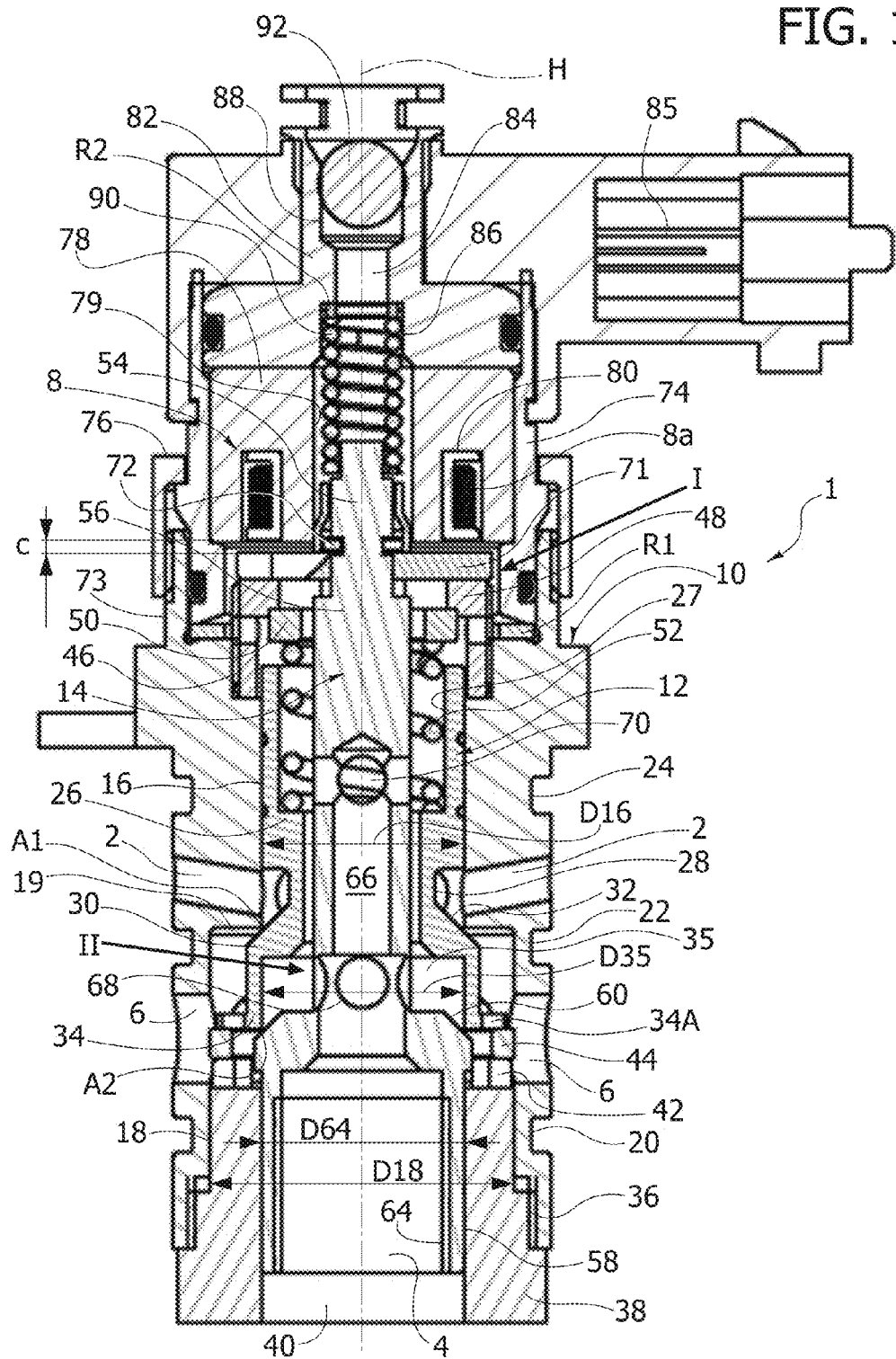
FIG. 1 comprises a first portion 1A illustrating a cross section of a solenoid valve according to a preferred embodiment of the invention and in a first operating position, a second portion 1B that represents a functional diagram of the solenoid valve according to the invention, a third portion 1C that shows a single-line schematic representation of the solenoid valve according to the invention in a generic operating position, and a fourth portion 1D that represents a variant of the diagram of FIG. 1C.
Figure 1B:
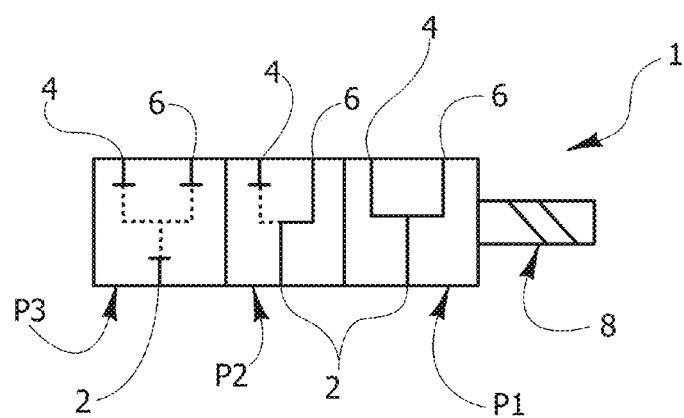

With reference to the schematic representation of FIG. 1B, the solenoid valve 1 comprises a first mouth 2 for inlet of a working fluid, and a second mouth 4 and a third mouth 6 for outlet of said working fluid. In a preferred embodiment, the working fluid is oil, but the solenoid valve 1 can work in the same way with other liquids or with gaseous fluids.

Once again with reference to FIG. 1B, the solenoid valve 1 comprises three operating positions designated by the references P1, P2, P3. An electromagnet 8 comprising a solenoid 8a can be controlled for causing a switching of the operating positions P1, P2, P3 of the solenoid valve 1, as will be described in detail hereinafter.

In the position P1 a passage of fluid from the first mouth 2 to the second mouth 4 and the third mouth 6 is enabled, in the position P2 a passage of fluid from the first mouth 2 to the third mouth 6 is enabled, whilst the passage of fluid from the mouth 2 to the mouth 4 is disabled (it should be noted that the opposite connection, i.e., the hydraulic connection from the first mouth 2 to the second mouth 4 without there being a hydraulic connection between the first mouth 2 and the third mouth 6 cannot be provided by the solenoid valve according to the invention), whereas finally in the position P3 the passage of fluid from the mouth 2 to the mouths 4 and 6 is completely disabled.

Once again with reference to FIG. 1B, the dashed segments connecting the mouths 2, 4 and 6 indicate schematically the leakages of liquid (in particular oil) through the dynamic seals provided between the moving components: said leakages (hydraulic consumption of the valve) come out of the mouth that is at a lower pressure.

With reference to FIG. 1A, the solenoid valve 1 comprises a plurality of components coaxial to one another and sharing a main axis H. In particular, the solenoid valve 1 comprises a jacket 10, housed in which are a first open/close element 12 and a second open/close element 14 and the electromagnet 8 containing the solenoid 8a. Moreover provided on the jacket 10 are the mouths 2, 6, whereas, as will emerge more clearly from the ensuing description, the mouth 4 is provided by means of the open/close element 14 itself.

The jacket 10 is traversed by a through hole sharing the axis H and comprising a first stretch 16 having a first diameter D16 and a second stretch 18 comprising a diameter D18, where the diameter D18 is greater than the diameter D16. At the interface between the two holes there is thus created a shoulder 19.

The mouths 2, 6 are provided by means of through holes with radial orientation provided, respectively, in a position corresponding to the stretch 16 and to the stretch 18 and in communication therewith.

Moreover provided on an outer surface of the jacket 10 are a first annular groove 20, a second annular groove 22, and a third annular groove 24, each of which are designed to receive a gasket of an O-ring type, arranged on opposite sides with respect to the radial holes that define the mouth 2 and to the radial holes that define the mouth 6.

In particular, the mouth 6 is comprised between the grooves 20 and 22, whereas the mouth 2 is comprised between the grooves 22 and 24.

Preferably, the three annular grooves 20, 22, 24 are provided with the same seal diameter so as to minimize the unbalancing induced by the resultant of the pressure forces acting on the outer surface of the jacket 10, which otherwise would be such as to jeopardize fixing of the jacket of the solenoid valve in the corresponding seat provided on a component or in an oleodynamic circuit where it is installed.

The first open/close element 12 is basically configured as a hollow tubular element comprising a stem 26—which is hollow and provided in which is a first cylindrical recess 27—, a neck 28, and a head 30, which has a conical contrast surface 32 and a collar 34. The neck 28 has a diameter smaller than that of the stem 26.

Moreover, preferably provided in the collar 34 is a ring of axial holes 34A, whilst a second cylindrical recess 35 having a diameter D35 is provided in the head 30.

The stem 26 of the open/close element 12 is slidably mounted within the stretch 16 in such a way that the latter will function as guide element and as dynamic-seal element for the open/close element 12 itself: the dynamic seal is thus provided between the environment giving out into which is the first mouth 2 and the environment giving out into which is the second mouth 4. This, however, gives rise to slight leakages of fluid through the gaps existing between the open/close element 12 and the stretch 16: the phenomenon is typically described as "hydraulic consumption" of the solenoid valve, and depends upon the difference in pressure between the environments straddling the dynamic seal itself, upon geometrical parameters of the gaps (in particular the axial length, linked to the length of the stem 26, and the diametral clearance) and, not least, by the temperature of the fluid, which as is known determines the viscosity thereof.

The axial length of the stem 26 is chosen in such a way that it will extend along the stretch 16 as far as the holes that define the mouth 2, which thus occupy a position corresponding to the neck 28 that provides substantially an annular fluid chamber.

The head 30 is positioned practically entirely within the stretch 18, except for a small surface portion 32 that projects within the stretch 16 beyond the shoulder 19. In fact, the head 30 has a diameter greater than the diameter D16 but smaller than the diameter D18, so that provided in a position corresponding to the shoulder 19 is a first contrast seat A1 for the open/close element 12, in particular for the conical surface 32.

In a variant of the solenoid valve of FIG. 1A, in a region corresponding to the shoulder 19 an annular chamfer is made that increases the area of contact with the conical surface 32 at the same time reducing the specific pressure developed at the contact therewith, hence minimizing the risks of damage to the surface 32. It in any case important for the seal diameter between the open/close element 12 and the shoulder 19 to be substantially the same as the diameter D16.

Provided at a first end of the jacket 10 is a first threaded recess 36 engaged in which is a bushing 38 having a through guide hole 40 sharing the axis H. The diameter of the hole 40 is equal to the diameter D35 for reasons that will emerge more clearly from the ensuing description.

The bushing 38 comprises a castellated end portion 42, which functions as contrast element for a spacer ring 44.

The spacer ring 44 offers in turn a contrast surface to the head 30 of the open/close element 12, in particular to the collar 34. In addition, the choice of the thickness of the spacer ring 44 enables adjustment of the stroke of the open/close element 12 and hence of the area of passage between the mouth 2 and the mouth 6.

Provided at a second end of the jacket 10, opposite to the first end, is a second threaded recess 46, engaged in which is a ringnut 48. The ringnut 48 functions as contrast for a ring 50, which in turn offers a contrast surface for a first elastic-return element 52 housed in the cylindrical recess 27.

The ringnut 48 is screwed within the threaded recess 46 until it comes to bear upon the shoulder between the latter and the jacket 10: in this way, the adjustment of the pre-load applied to the elastic-return element 52 is determined by the thickness (i.e., by the band width) of the ring 50.

The second open/close element 14 is set inside the stem 26 and is slidable and coaxial with respect to the first open/close element 12.

The open/close element 14 comprises:
a terminal shank 54 at a first end thereof,
a stem 56, and
a head 58, set at a second end thereof, having a conical contrast surface 60 and a cup-shaped end portion 64, in which the head 58 and the shank 54 are connected by the stem 56.

It should moreover be noted that the geometry of the castellated end 42 contributes to providing, by co-operating with the holes 34a, a passageway for the flow of fluid that is sent on through the section of passage defined between the conical surface 60 and the contrast seat A2 towards the second mouth 4.

The cup-shaped end portion 64 has an outer diameter D64 equal to the diameter of the hole 40 and comprises a recess that constitutes the outlet of a central blind hole 66 provided in the stem 56. The hole 66 intersects a first set of radial holes and a second set of radial holes, designated, respectively, by the reference numbers 68, 70. In this embodiment the two sets each comprise four radial holes 68, 70 set at the same angular distance apart.

The position of the aforesaid sets of radial holes is such that the holes 68 are located substantially in a position corresponding to the cylindrical recess 35, whilst the holes 70 are located substantially in a position corresponding to the cylindrical recess 27.

Coupling between the cup-shaped end portion 64 (having a diameter D64) and the hole 40 (having a diameter substantially equal to the diameter D64) provides a dynamic seal between the open/close element 14 and the bushing 38: this seal separates the environment giving out into which is the third mouth 6 from the environment giving out into which is the second mouth 4. In a way similar to what has been described for the dynamic seal provided between the mouths 2 and 6, the hydraulic consumption depends not only upon the temperature and the type of fluid, but also upon the difference in pressure existing between the environments giving out into which are the mouths 2 and 4, upon the diametral clearance, upon the length of the coupling between the cup-shaped end portion 64 and the bushing 38, and upon other parameters such as the geometrical tolerances and the surface finish of the various components. The hydraulic consumptions of the two dynamic seals add up and define the total hydraulic consumption of the solenoid valve 1.

Fitted on the terminal shank 54 is an anchor 71 provided for co-operating with the solenoid 8, which has a reference position defined by a half-ring 72 housed in an annular groove on the shank 54; advantageously, the anchor 71 can be provided as a disk comprising notches with the dual function of lightening the overall weight thereof and of reducing onset of parasitic currents.

Provided at a second end of the jacket 10, opposite to the one where the bushing 38 is located, is a collar 73 inserted within which is a cup 74, blocked on the collar 73 by means of a threaded ringnut 76 that engages an outer threading made on the collar 73.

Set in the cup 74 is a toroid 78 housing the solenoid 8, which is wound on a reel 80 housed in an annular recess of the toroid 78 itself. The toroid 78 is traversed by a through hole 79 sharing the axis H and is surmounted by a plug 82 bearing thereon and blocked on the cup 74 by means of a cap 84 bearing a seat for an electrical connector 85 and electrical connections (not visible) that connect the electrical connector to the solenoid 8.

The toroid 78 comprises a first base surface, giving out on which is the annular recess 79, which offers a contrast to the anchor 71, determining the maximum axial travel thereof (i.e., the stroke), designated by c. The maximum axial travel of the anchor 71 is hence determined by subtracting the thickness of the anchor 71 itself (i.e., the band width thereof) from the distance between the first base surface of the toroid 78 and the ringnut 48. In order to adjust the stroke c of the anchor 71 a first adjustment shim R1 is provided, preferably provided as a ring having a calibrated thickness; alternatively, it is possible to replace the anchor 71 with an anchor of a different thickness. The stroke c of the anchor 71 is hence constituted by three components:
a first component $c_v$, which represents the loadless stroke, which terminates when the top surface of the anchor engages the half-ring 72;
a second component $\Delta_{14}$, which corresponds to the displacement of just the second open/close element 14; and
a third component $\Delta_{12}$, which corresponds to the simultaneous displacement of both of the open/close elements.

It should moreover be noted that the pressure of the fluid in the environment giving out into which is the mouth 4 exerts its own action also on the anchor 71, on the toroid 78, on the elastic element 90, on the ringnut 48, and on the shank 54 of the open/close element 14 this entailing adoption, for protecting the electromagnet 8, of static-seal elements.

The plug 82 comprises a through hole 84 sharing the axis H and comprising a first stretch and a second stretch with widened diameter 86, 88 at opposite ends thereof. It should be noted that the through hole 84 enables, by means of introduction of a measuring instrument, verification of the displacements of the open/close element 14 during assemblage of the solenoid valve 1.

The stretch 86 communicates with the hole 79 and defines therewith a single cavity set inside which is a second elastic-return element 90, co-operating with the second open/close element 14. The elastic-return element 90 bears at one end upon a shoulder made on the shank 54 and at another end upon a second adjustment shim R2 bearing upon a shoulder created by the widening of diameter of the stretch 86. The adjustment shim R2 has the function of adjustment of the pre-load of the elastic element 90.

Forced in the stretch 88 is a ball 92 that isolates the hole 84 with respect to the environment, preventing accidental exit of liquid.

All the components so far described are coaxial to one another and share the axis H.

Operation of the solenoid valve 1 is described in what follows.

In a preferred application, the solenoid valve 1 is inserted in an oleodynamic circuit in such a way that each of the mouths 2, 4, 6 is hydraulically connected to a corresponding environment, each having its own level of pressure—respectively $p_2$, $p_4$, $p_6$—and being such that $p_2 > p_6 > p_4$.

Figure 1C:
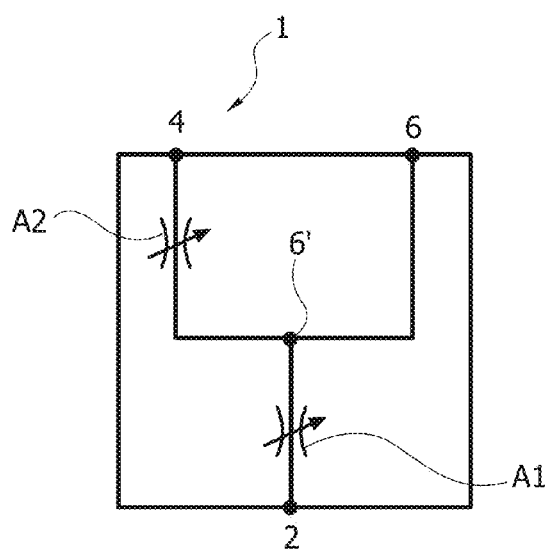
Figure 1D:
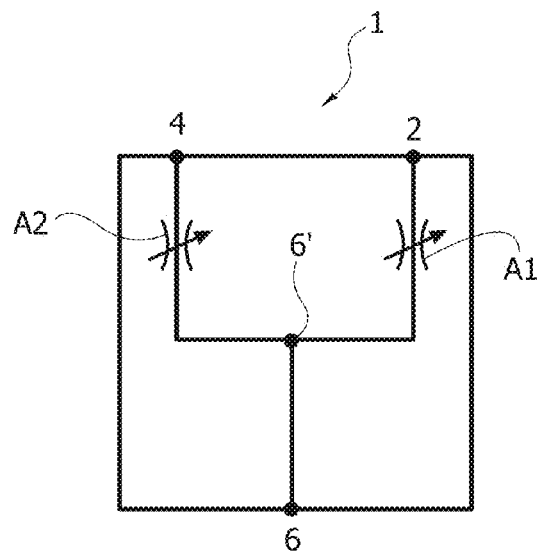

FIG. 1C shows a single-line diagram that illustrates the solenoid valve 1 in a generic operating position: it should be noted how arranged between the first mouth 2 and the second mouth 4 are two flow restrictors with variable cross section A1 and A2, which represent schematically the passage ports provided by the first and second open/close elements.

In the node between the mouths 2, 4 and 6, designated by 6', the value of the pressure is equal to that at the third mouth 6 but for the pressure drops along the branch 6-6'. Set between the mouth 4 and the node 6' is the flow restrictor A2, which represents schematically the action of the second open/close element 14. Likewise, set between the mouth 2 and the node 6' is the flow restrictor with variable cross section A1, which represents schematically the action of the first open/close element 12.

The positions P1, P2, P3 correspond to particular values of the section of passage of the flow restrictors A1, A2, in turn corresponding to different positions of the open/close elements 12, 14, as will emerge more clearly from the ensuing description. In particular:

position P1: A1, A2 have a maximum area of passage;
  position P2: A1 has a maximum area of passage, A2 has a zero area of passage;
  position P3: A1, A2 have a zero area of passage.

FIG. 1A illustrates the first operating position P1 of the solenoid valve 1, in which the first and second open/close elements 12, 14 are in the resting position. This means that no current traverses the solenoid 8 and no action is exerted on the anchor 71, so that the open/close elements 12, 14 are kept in position by the respective elastic-return elements 52, 90.

In particular, the first open/close element 12 is kept bearing upon the ring 44 by the first elastic-return element 52, whilst the second open/close element 14 is kept in position thanks to the anchor 71: the second elastic-return element 90 develops its own action on the shank 54, and said action is transmitted to the anchor 71 by the half ring 72, bringing the anchor 71 to bear upon the ringnut 48.

In this way, with reference to FIG. 1A (without neglecting the corresponding schematic representation of FIGS. 1B and 1C), the passage of fluid from the inlet mouth 2 to the first outlet mouth 4 and to the second outlet mouth 6 is enabled. In fact, the fluid entering the radial holes that define the mouth 2 invades the annular volume around the neck 28 of the first open/close element 12 and traverses a first gap existing between the conical surface 32 and the first contrast seat A1.

In said annular volume there is set up, on account of the head losses due to traversal of the radial holes that define the mouth 2, a pressure $p_6' > p_4$. In this way, the fluid proceeds spontaneously along its path towards the mouth 4 traversing the second gap set between the conical surface 60 and the second contrast seat A2.

In this way, the fluid can invade the cylindrical recess 35 and pass through the holes 68, invading the cup-shaped end portion 64 and coming out through the hole 40; it should be noted that the pressure that is set up in the volume of the cylindrical recess 35 is slightly higher than the value $p_4$ by virtue of the head losses due to traversal of the holes 68. Finally, it should be noted that the open/close element 12 itself and the guide bushing 38 define the second mouth 4.

Figure 4A:
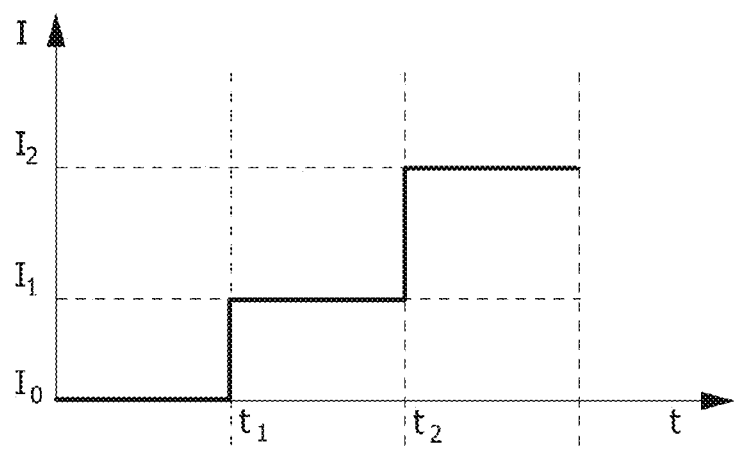
FIG. 4 comprises a first portion 4A, a second portion 4B, and a third portion 4C, representing the plots of various characteristic quantities of operation of the solenoid valve according to the invention.
Figure 4B:
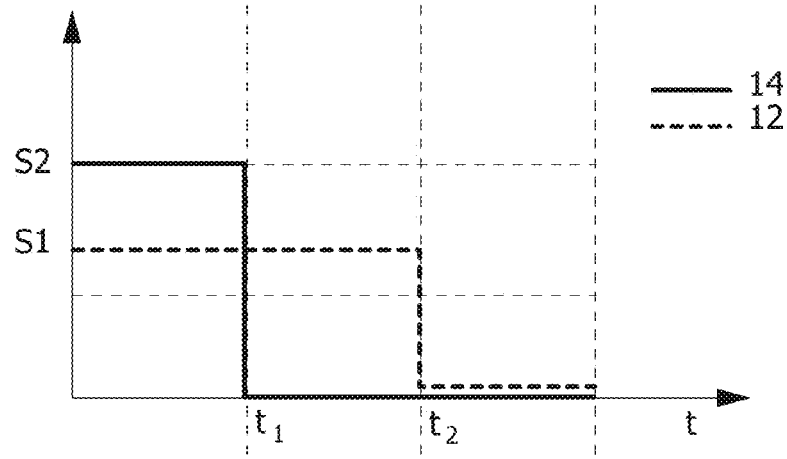
Figure 4C:
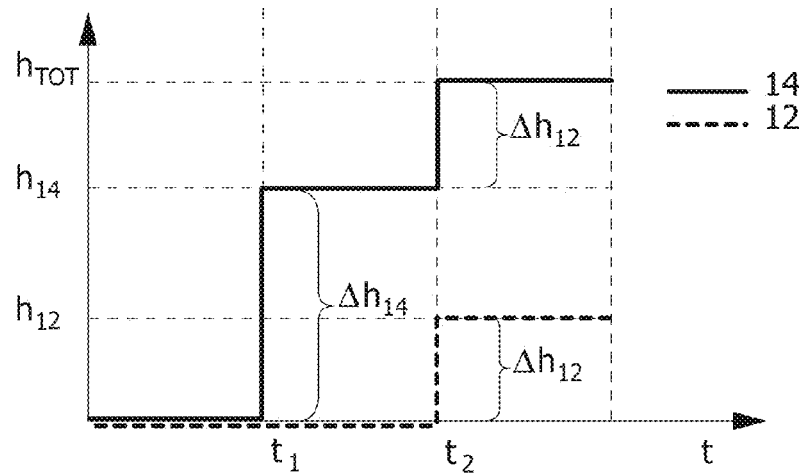

The diagrams of FIGS. 4A, 4B and 4C represent the time plots of various operating quantities of the solenoid valve 1, observed in particular during a time interval in which two events of switching of the operating position of the solenoid valve 1 occur.

The diagram of FIG. 4A illustrates the time plot of a current of energization of the solenoid 8, the diagram of FIG. 4B illustrates the time plot of the area of passage for the fluid offered by the sections of passage created by the open/close elements 12, 14 co-operating with the respective contrast seats A1, A2, and the diagram of FIG. 4C illustrates the plot of the (partial) absolute displacements $h_{12}$, $h_{14}$ of the open/close elements 12, 14, having assumed as reference (zero displacement) the resting position of each of them. The reference $h_{TOT}$ indicates the overall displacement of the open/close element 14, equal to the sum of the displacement $h_{12}$ and of the partial displacement $h_{14}$.

Corresponding to the operating position P1 illustrated in FIG. 1 is a current of energization of the solenoid 8 having intensity $I_0$ with zero value (FIG. 4A).

At the same time, with reference to FIG. 4B, in the operating position P1 the second open/close element 14 defines with the contrast seat A2 a gap having area of passage S2, whereas the first open/close element 12 defines with the contrast seat A1 a gap having area of passage S1, which in this embodiment is smaller than the area S2. The function of dividing the total stroke $h_{tot}$ into the two fractions $\Delta h_{12}$ and $\Delta h_{14}$ is entrusted to the shim 44.

In addition, with reference to FIG. 4C, in the operating position P1 the displacements of the open/close elements 12, 14 with respect to the respective resting positions are zero.

Figure 2A:
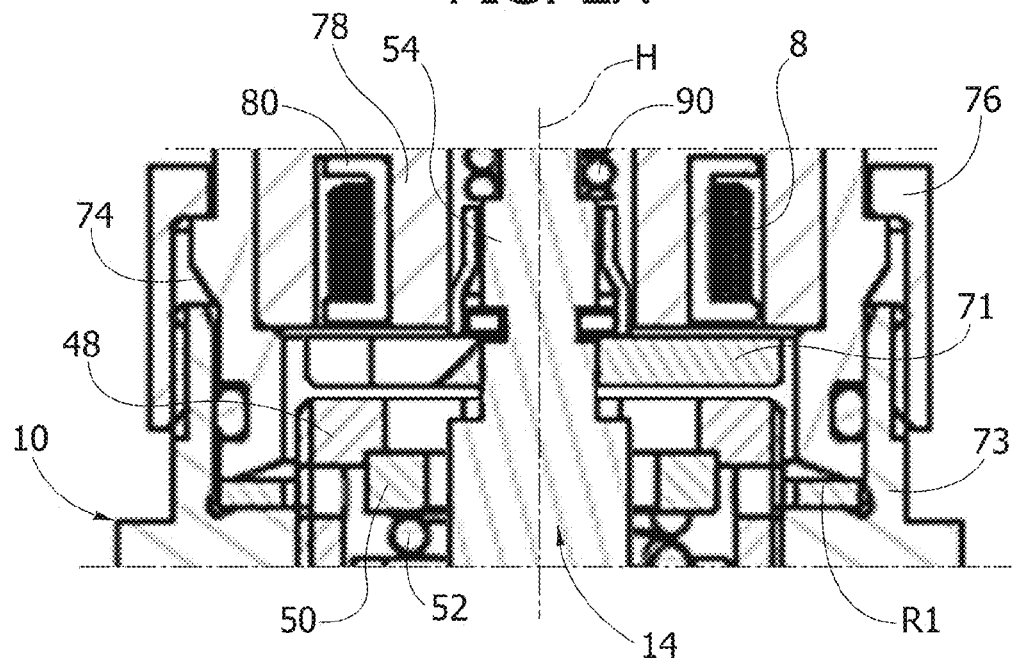
FIG. 2 comprises a first portion 2A and a second portion 2B, illustrating two enlargements of details indicated by the arrows I and II in FIG. 1 and referring to a second operating position of the solenoid valve according to the invention.
Figure 2B:
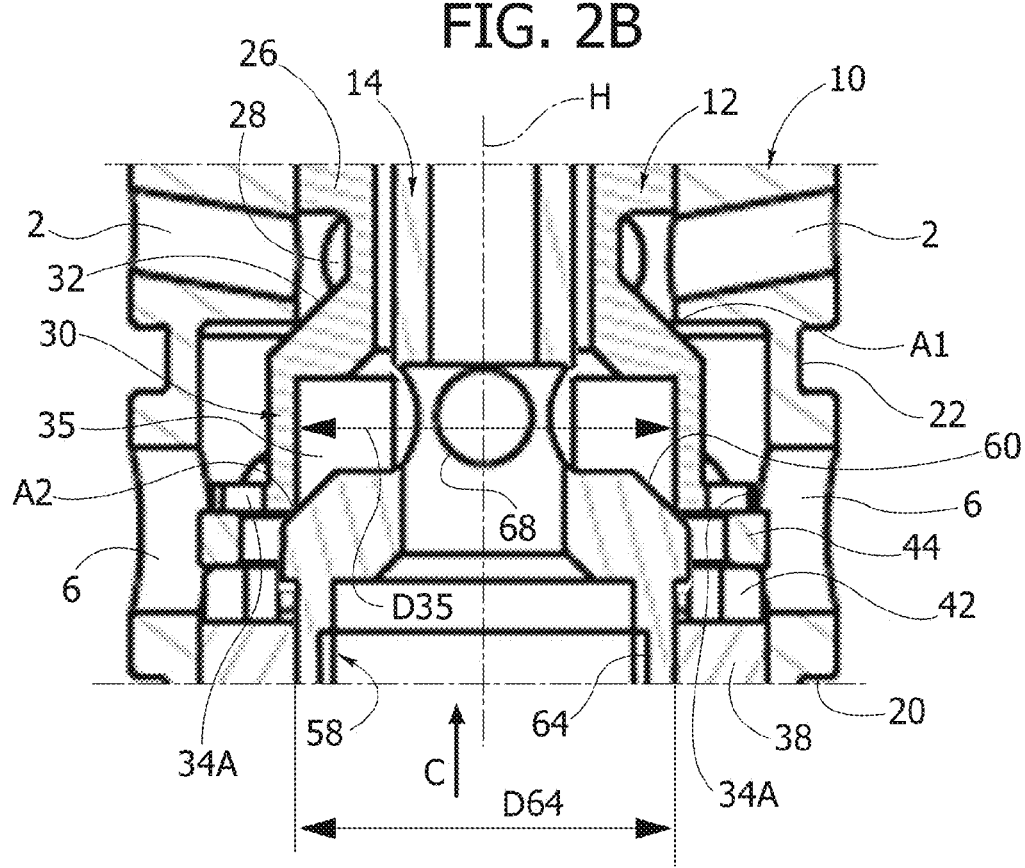

With reference to FIGS. 2A, 2B, the enlargements illustrate in detail the configuration of the open/close elements in the operating position P2.

The operating position P2 is activated following upon a first event of switching of the solenoid valve 1 that occurs at an instant $t_1$ in which an energization current of intensity $I_1$ is supplied to the solenoid 8.

The intensity $I_1$ is chosen in such a way that the action of attraction exerted by the solenoid 8 on the anchor 71 will be such as to overcome the force developed by the elastic-return element 90 alone. In other words, the solenoid 8 is actuated for impressing on the second open/close element a first movement $\Delta h_{14}$ in an axial direction H having a sense indicated by C in FIG. 2 whereby the second open/close element, in particular the conical surface 60, is brought into contact with the second contrast seat A2 disabling the passage of fluid from the first mouth 2 to the second mouth 4, and hence providing a transition from the first operating position P1 to the second operating position P2.

With reference to the diagrams of FIG. 4, the above is equivalent to a substantial annulment of the area of passage S2 and to a displacement $\Delta h_{14}$ of the open/close element 14 in an axial direction and with sense C. The anchor 71 is detached from the ringnut 48 and substantially occupies an intermediate position between this and the toroid 78.

It should be noted that the movement of the open/close element 14 stops in contact with the contrast seat A2 since, in order to proceed, it would be necessary to overcome also the action of the elastic element 52, which is impossible with the energization current of intensity $I_1$ that traverses the solenoid 8.

The open/close element 14 (as likewise the open/close element 12, see the ensuing description) is moreover hydraulically balanced; consequently, it is substantially insensitive to the values of pressure with which the solenoid valve 1 operates.

By "hydraulically balanced" referred to each of the open/close elements 12, 14 is meant that the resultant in the axial direction (i.e., along the axis H) of the forces of pressure acting on the open/close element is zero. This is due to the choice of the surfaces of influence on which the action of the pressurized fluid is exerted and of the dynamic-seal diameters (in this case also guide diameters) of the open/close elements. In particular, the dynamic-seal diameter of the open/close element 14 is the diameter D64, which is identical to the diameter D35 of the cylindrical recess 35, which determines the seal surface of the open/close element 14 in a region corresponding to the contrast seat A2 provided on the open/close element 12.

The same applies to the open/close element 12, where the dynamic-seal diameter is the diameter D16, which is equal to the diameter of the stem 26 (but for the necessary radial plays) and coincides with the diameter of the contrast seat A1, provided on the jacket 10, which determines the surface of influence of the open/close element 12.

In a particular variant, it is possible to design the solenoid valve 1 in such a way that the diameters D64 and D35 associated to the open/close element 14 are substantially equal to the diameter D16 and to the diameter of the seat A1 of the open/close element 12.

Figure 3A:
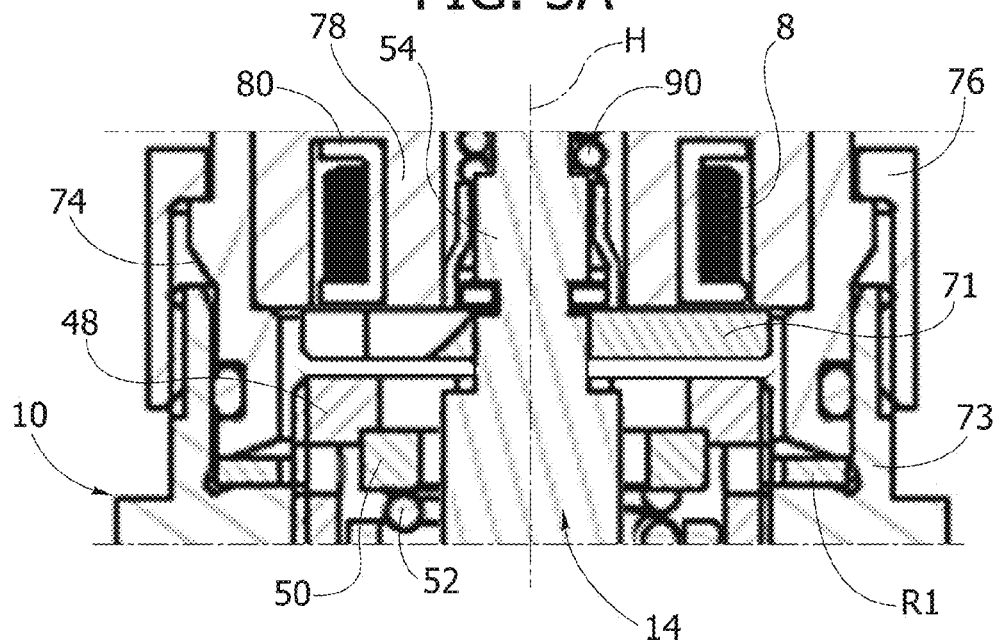
FIG. 3 comprises a first portion 3A and a second portion 3B, illustrating two enlargements of details indicated by the arrows I and II in FIG. 1 and referring to a third operating position of the solenoid valve according to the invention.
Figure 3B:
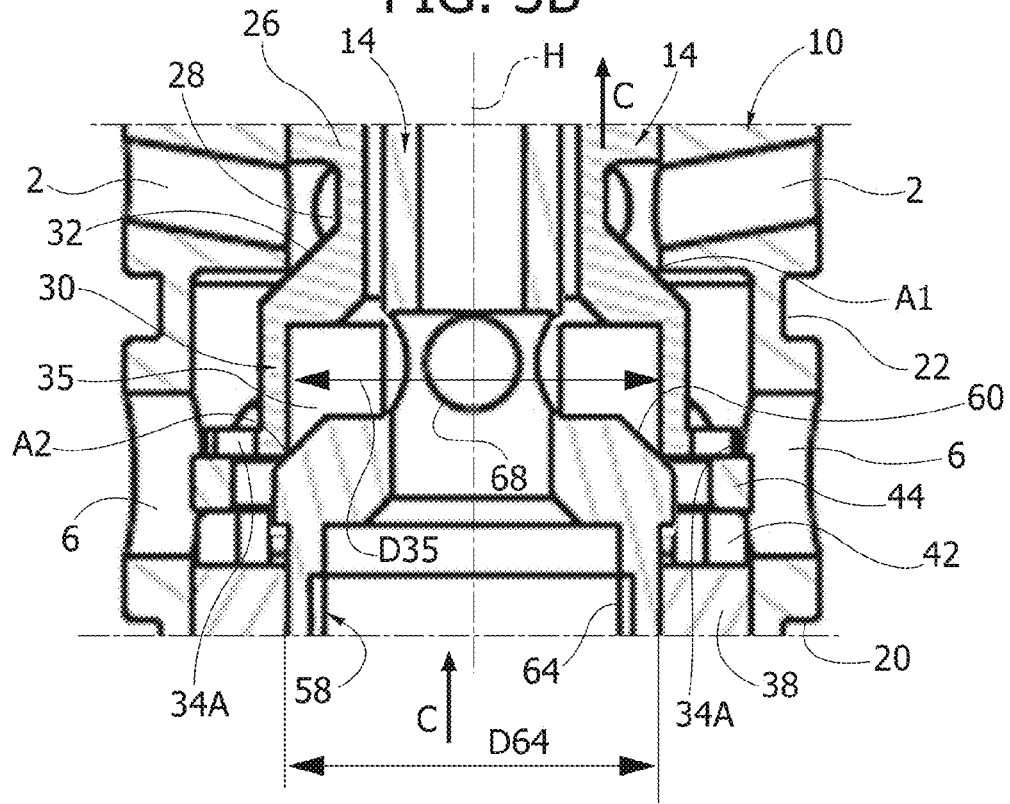

The configuration of the open/close elements 12, 14 in the third operating position P3 is illustrated in FIGS. 3A-3B. With reference moreover to FIGS. 4A to 4C, at an instant $t_2$, a command is issued for an increase in the energization current that traverses the solenoid 8, which brings the intensity thereof from the value $I_1$ (kept throughout the time that elapses between $t_1$ and $t_2$) to a value $I_2 > I_1$.

This causes an increase of the force of attraction exerted by the solenoid 8 on the anchor 71, whereby impressed on the second open/close element 14 is a second movement, subsequent to the first movement, thanks to which the second open/close element 14 draws the first open/close element 12 into contact against the first contrast surface A1, hence disabling the passage of fluid from the mouth 2 to the mouth 6. In fact, there is no longer any gap through which the fluid that enters the mouth 2 can flow towards the mouth 6. The diagram of FIG. 4B is a graphic illustration of the annulment of the section of passage S1 at the instant $t_2$.

It should be noted that—on account of what has been described previously—during the aforesaid second movement, in which the open/close element 12 is guided by the bushing 38, the second open/close element 14 remains in contact with the first open/close element 12 maintaining the passage of fluid from the mouth 2 to the mouth 4 disabled. The corresponding displacement of the open/close element 14, which is the same as the one that the open/close element 12 undergoes (both of them in the sense C and in the axial direction), is designated by $\Delta h_{12}$ in FIG. 4C.

There is thus obtained a transition from the second operating position P2 to the third operating position P3, in which, in effect, the environments connected to each of the mouths of the solenoid valve 1 are isolated from one another, except for the flows of fluid that leak through the dynamic seals towards the environment with lower pressure, i.e., towards the second mouth 4. In the design stage, the dynamic seals are conceived in such a way that any leakage of fluid is in any case negligible with respect to the one that can be measured when the solenoid valve is in the operating positions P1 and/or P2.

The higher intensity of current that circulates in the solenoid 8 is necessary to overcome the combined action of the elastic-return elements 90 and 52, which tend to bring the respective open/close elements 14, 12 back into the resting position.

It should be noted that also in this circumstance, given that the open/close element 12 is hydraulically balanced, the action of attraction developed on the anchor 71 must overcome only the return force of the springs 90, 52, in so far as the dynamic equilibrium of the open/close elements 12, 14 is indifferent to the action of the pressure of the fluid, given that said open/close elements are hydraulically balanced.

It is in this way possible to choose a solenoid 8 of contained dimensions and it is thus possible to work with contained energization currents and with times of switching between the various operating positions of the solenoid valve contained within a few milliseconds, with a pressure $p_2$, for example, in the region of 400 bar. Other typical pressures for the environment connected to the mouth for inlet of the fluid are 200 and 300 bar (according to the type of system).

With reference to FIG. 5, an application of the solenoid valve 1 to an anti-lock braking system (ABS) of a motor vehicle is illustrated by way purely of example.

Figure 5A:
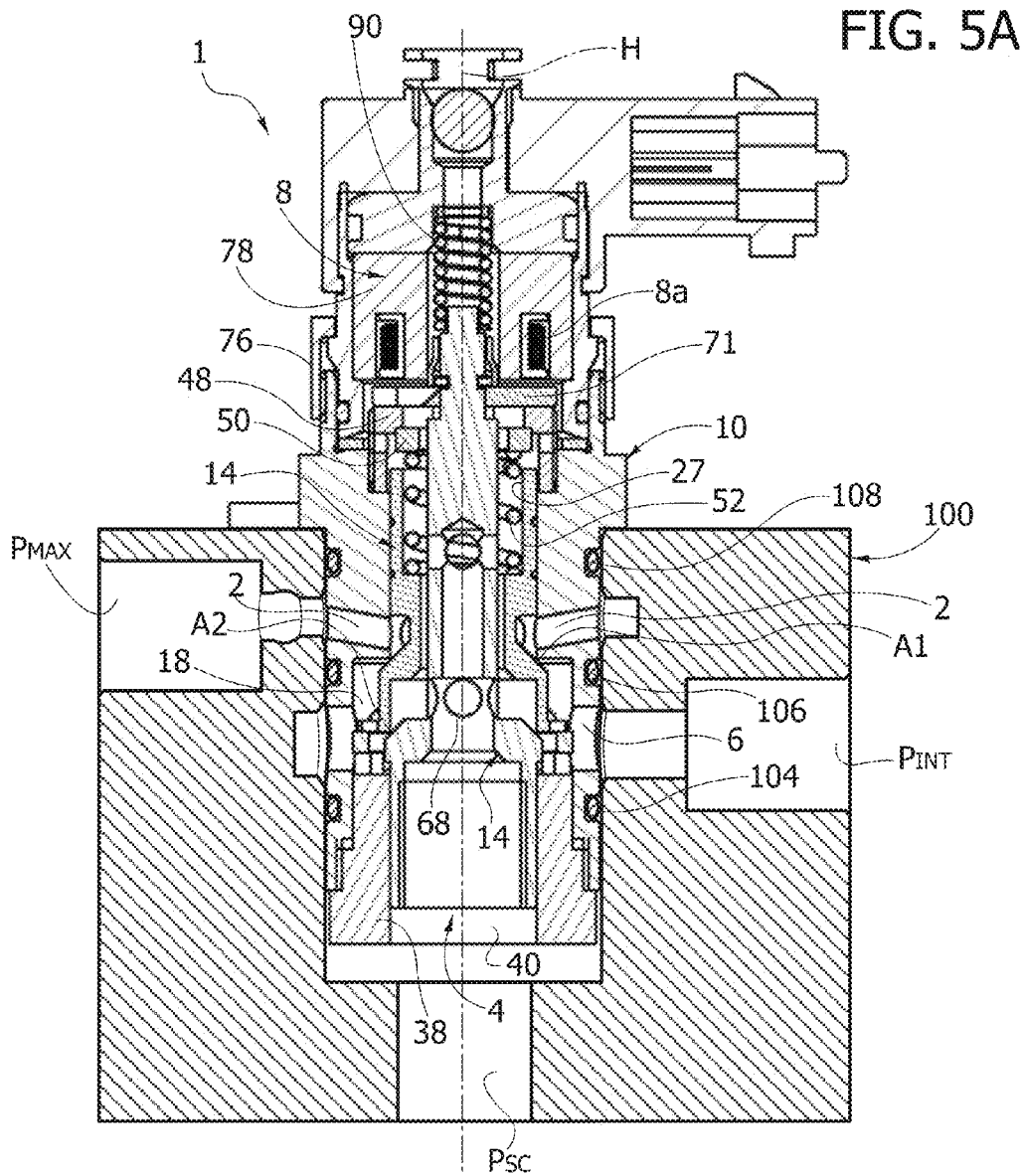
FIG. 5 comprises a first portion 5A illustrating in cross section an example of installation of the solenoid valve of FIG. 1 and a second portion 5B illustrating a hydraulic diagram of a possible application of the solenoid valve according to the invention.

With reference to FIG. 5A, the solenoid valve 1, which in the embodiment described is of the so-called "cartridge" type, is inserted into a body 100—which functions as connection element—communicating with a first environment, a second environment, and a third environment designated by the references VC, V1, V2. The environments VC, V1, V2 are, respectively, at a level of pressure $p_{MAX}$ (or control pressure), $p_{INT}$ (intermediate pressure), and $p_{SC}$ (exhaust pressure), lower than the intermediate pressure $p_{INT}$.

It should moreover be noted that the solenoid valve 1 is inserted in the body 100 in a seat 102 in which there is a separation of the levels of pressure associated to the individual environments by means of three gaskets of an O-ring type housed, respectively, in the annular grooves 20, 22 and 24 and designated, respectively, by the reference numbers 104, 106, 108.

In particular, the O-ring 104 guarantees an action of seal in regard to the body across the environments V2 V1, whilst the O-ring 106 guarantees an action of seal in regard to the body across the environments V1 and VC. The last O-ring, designated by the reference number 108, exerts an action of seal that prevents any possible leakage of fluid on the outside of the body.

Figure 5B:
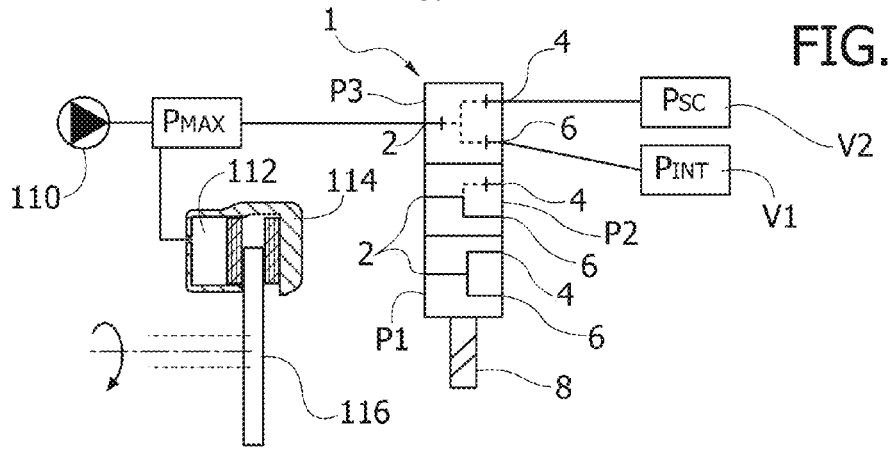

With reference to FIG. 5B, in the specific application considered, the environment VC at pressure $p_{MAX}$ is a control volume of a braking system set on a hydraulic power line that hydraulically connects a braking-liquid pump 110 to a cylinder 112 of a brake calliper 114, here represented as being of a floating type but the same applies to callipers of a fixed type.

The calliper 114 exerts its own action on a disk 116, connected in rotation to the wheel of a vehicle.

The control volume VC is hydraulically connected to the inlet mouth 2 of the solenoid valve 1, whilst connected to the second and third mouths 4, 6 of the solenoid valve 1 are the environments V2 and V1, respectively, where the environment V1 is functionally a further control volume kept at a level of pressure lower than the pressure $p_{MAX}$ that obtains in the control volume VC during braking, whilst the environment V2 coincides with an exhaust environment, in which the relative pressure is substantially zero.

In normal operating conditions of the vehicle, in which the ABS does not intervene, the control volume VC is pressurized—during a braking action—by the action of the user, who via the hydraulic pump 110 sends pressurized fluid to the cylinder 112 causing gripping of the calliper 114 on the disk 116. The solenoid valve 1 is kept in the operating position P3, which is equivalent to a completely traditional operation of the braking system of the vehicle.

The pressure that is set up in the control volume VC is equal to the pressure of the fluid in the cylinder 112 during braking, whereas the value of intermediate pressure $p_{int}$ is modulated by means of an electronic control unit operatively connected to a regulation device (neither of which are illustrated in FIG. 5B), as a function of the boundary conditions detected by sensors in themselves known, such as, for example, icy, wet, or damp, road surface, the type of asphalt or else again the temperature of the disks 116.

In the case where the sensors of the ABS, in themselves known, detect locking of the wheels of the vehicle during braking, the system intervenes and performs its own function by exploiting the switching of the operating positions of the solenoid valve 1 to modulate the braking action.

In particular, the solenoid valve 1 is switched into the position P1 in the case where a control unit of the ABS determines the need for a practically total release of the braking action on the disk 116 or when the braking action impressed by the user ceases.

In this case, in fact, the control volume VC, and consequently the cylinder 112, would be hydraulically connected to the environment V2, thus setting it in the discharging condition.

In the case where the aforesaid control unit of the ABS determines that there is the need for a partial restoring (or, if there has not been a total release of the braking action, it determines that there is the need for a partial release) of the braking action on the disk 116, the electromagnet 8 is controlled so as to switch the solenoid valve into the operating position P2, in which the control volume VC is hydraulically connected to the volume at intermediate pressure V1 and is isolated from the exhaust environment V2.

In this case, the control volume VC is depressurized, causing a partial release of the action on the disk 116. Finally, should the electronic control unit of the ABS determine that it is necessary to restore the maximum braking action on the disk 116, the solenoid 8 is governed so as to switch the solenoid valve again into the position P3.

Of course, it is possible to exploit the potentialities of modern electronic control units so as to impart high-frequency signals to the solenoid valve 1 obtaining switchings that are very fast, i.e., with frequencies typical of ABSs.

Moreover, the application of the solenoid valve 1 to a braking system entails a second advantage: in fact, for what has been described previously, it is not possible to make a direct switching from the operating position P3 to the operating position P1, which imposes on the solenoid valve to assume, albeit for an extremely short time interval, the operating position P2. This results in a more gradual deceleration during release of the brake.

It should be noted that in said perspective, it is extremely important for the open/close elements 12 and 14 to be hydraulically balanced, in so far as, if it were not so, there would be the need for forces of actuation that would be too high to guarantee the required dynamics, which in turn would entail an oversizing of the components (primarily, the solenoid 8) in addition to a dilation of the switching times, which might not be compatible with constraints of space and with the operating specifications typical of the systems discussed herein.

Of course, the details of construction and the embodiments may vary widely with respect to what is described and illustrated herein, without thereby departing from the sphere of protection of the present invention, as defined by the annexed claims.

For example, the seals between the open/close elements 12, 14 and the respective contrast seats A1, A2 can be provided by means of the contact of two conical surfaces, where the second conical surface replaces the sharp edges of the shoulders on which the contrast seats are provided.

Moreover, in the case where the working fluid is of a gaseous type or in the case where the application for which the solenoid valve is designed does not admit of any hydraulic consumption (or, likewise, in the case where a total lack of hydraulic communication between the various environments giving out into which are the various mouths of the solenoid valve is required), as an alternative to the dynamic seals provided by means of radial clearance between the moving elements described previously, it is possible to adopt dynamic-seal rings, in themselves known and specific for use with gaseous fluids.

For example, the rings can be of a self-lubricating type, hence with a low coefficient of friction, so as not to introduce high forces of friction and not to preclude operation of the valve itself.

Figure 6:
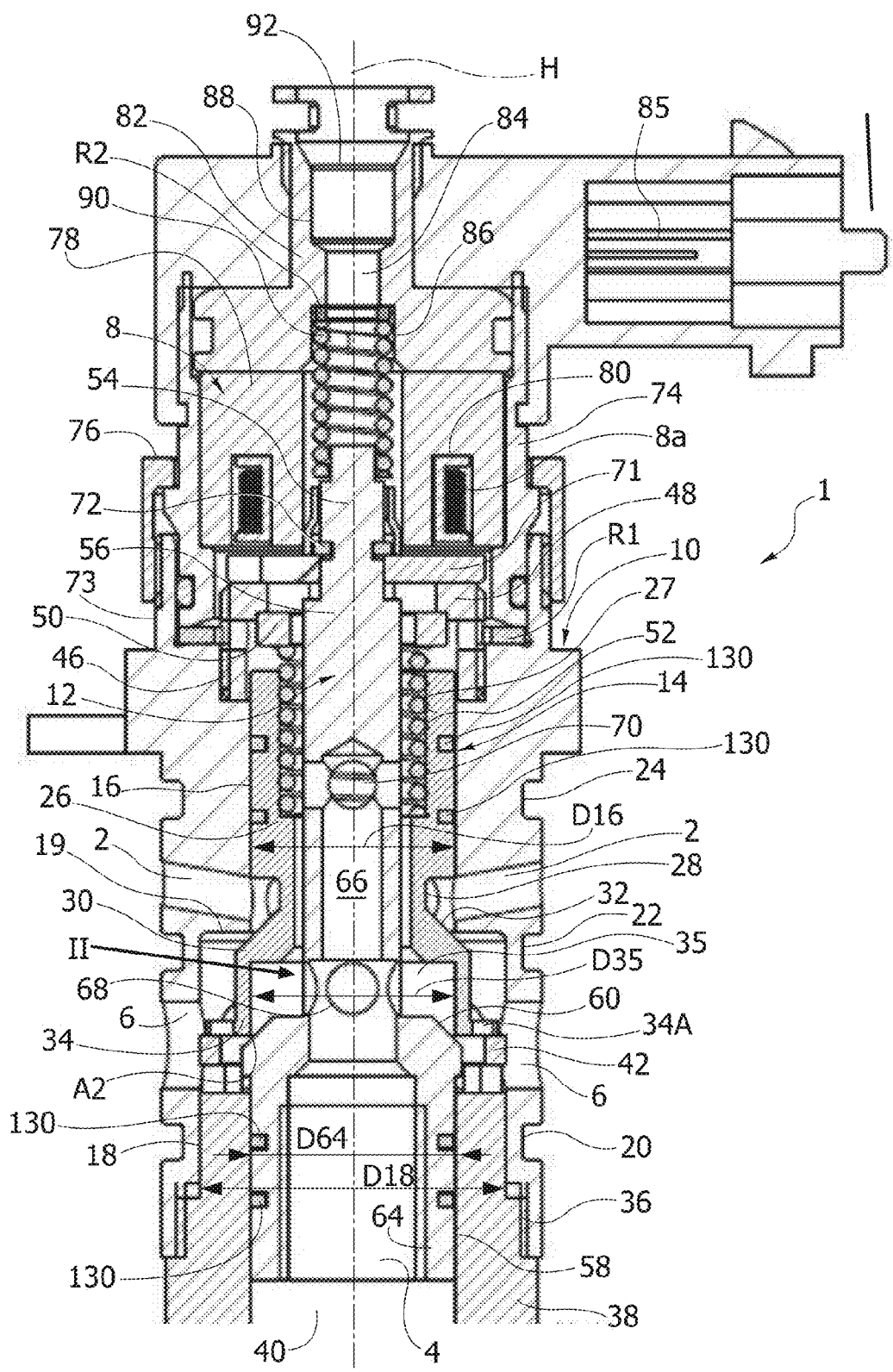
FIG. 6 illustrates a variant of the solenoid valve of FIG. 1A.

FIG. 6 illustrates, by way of example, an embodiment of the solenoid valve 1 that envisages use of dynamic-seal rings designated by the reference number 130.

In the example of application described here, there is assumed the hydraulic connection of the second mouth 4 with an environment with minimum pressure (typically an exhaust environment) and the hydraulic connection of the third mouth 6 with an environment with a pressure intermediate between the value of the pressure $p_2$ and the value of the pressure $p_4$.

If the connection of the mouths 4 and 6 to the respective environments is reversed, i.e., if the mouth 4 is connected to an environment at intermediate pressure and the mouth 6 to an environment at minimum pressure, the behaviour of the solenoid valve 1 varies.

In particular, in the operating position P1 of the solenoid valve, as previously defined, the environment connected to the first mouth 2 and the environment connected to the second mouth 4 will be set in the discharging condition towards the environment connected to the third mouth 6 and the leakages of fluid will have a direction such as to flow from the environment connected to the mouth 4 to the environment connected to the mouth 6.

By switching the solenoid valve 1 from the operating position P1 to the operating position P2, the environment connected to the second mouth 4 is excluded, while there remains only the hydraulic connection of the inlet environment connected to the first mouth 2 with the mouth 6, i.e., with the exhaust: as compared to the previous operating position, the flowrate measured at outlet from the mouth 6 will be lower than in the previous case, since the contribution of the flow from the mouth 4 to the mouth 6 ceases.

Finally, by switching the solenoid valve 1 from the operating position P2 to the operating position P3, also the hydraulic connection between the environment connected to the mouth 2 and the environment connected to the mouth 6 will be disabled.

The inventors have moreover noted that it is particularly advantageous to connect the mouths 2, 4, 6 of the solenoid valve 1 between environments with pressure levels that are different again from the cases described. In particular, it is possible to connect the mouth 6 to an environment with pressure $p_6$ with $p_6 > p_4$ and $p_6 > p_2$, irrespective of the values of the pressures $p_4$ and $p_2$, in the environments connected, respectively, to the mouths 4 and 2 (this means that we may indifferently have $p_4 > p_2$ or $p_2 > p_4$). It should be noted that in this situation it is the mouth 6 that performs the function of inlet mouth for the fluid, whereas the mouths 2 and 4 function as outlet mouths for the fluid. Consequently, according to the convention so far adopted in this case the mouth 6 is the first mouth and the mouths 4, 2 are the second and third mouths, respectively. At times the correspondence will be explicitly indicated in brackets in the text, where necessary.

With this mode of connection, in the operating position P1 there hence will be a flow of fluid both from the mouth 6 to the mouth 4 and from the mouth 6 to the mouth 2; consequently, both of the environments at pressure $p_4$ and at pressure $p_2$ will be supplied.

By switching the solenoid valve 1 from the operating position P1 to the operating position P2, connection of the environment at pressure $p_4$ to the other two environments will be disabled and consequently there will be only a flow of fluid from the mouth 6 to the mouth 2. Finally, by switching the solenoid valve from the operating position P2 to the operating position P3, also the hydraulic connection between the environment at pressure $p_6$ and the environment at pressure $p_2$ (i.e., between the mouth 6 and the mouth 2) will be disabled.

It should moreover be noted that, unlike the mode of connection previously described in which the mouth 2 functions as inlet mouth for the fluid, in this case the solenoid valve 1 induces lower head losses in the current fluid that traverses it and proceeds from the mouth 6 to the mouths 2 and 4. This is represented schematically in the single-line diagram of FIG. 1D: by reversing the functions of the mouths 2 and 6, the gaps defined by the open/close elements 12, 14 are arranged in parallel with respect to one another, i.e., the fluid that from the inlet mouth 6 (first mouth) proceeds towards the outlet mouths 2 (third mouth) and 4 (second mouth) must traverse a single gap, in particular the gap between the open/close element 14 and the contrast seat A2 for the fluid that from the mouth 6 proceeds towards the mouth 4, and the gap between the open/close element 12 and the contrast seat A1 for the fluid that from the mouth 6 proceeds towards the mouth 2 (the node 6' hence has substantially the same pressure as the one that impinges on the mouth 6). In the case of the connection where the mouth 2 functions as inlet mouth for the fluid (FIG. 1C), the fluid that flows towards the mouth 4 must traverse both of the gaps, with consequent higher head losses.

Figure 7:
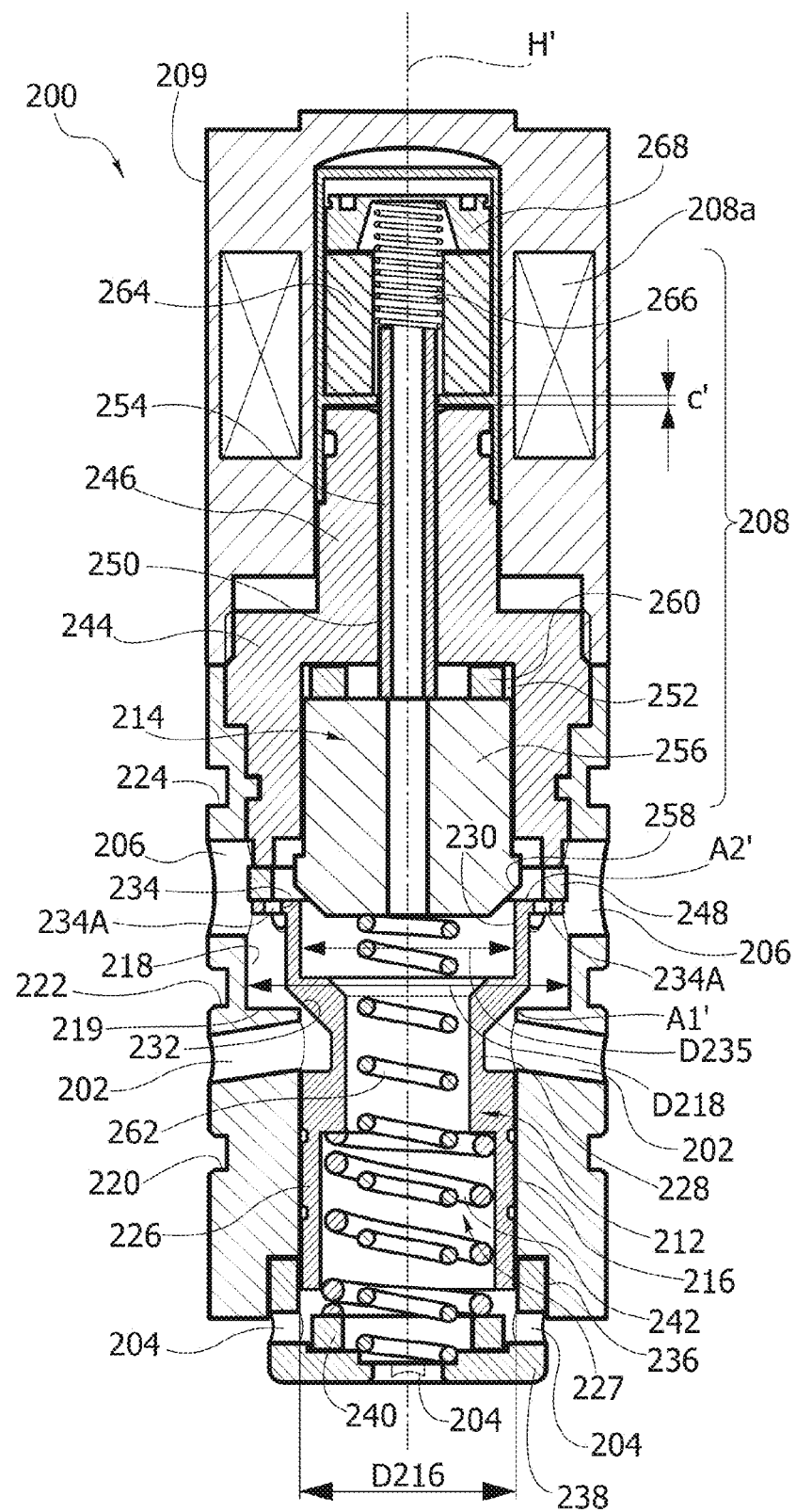
FIG. 7 illustrates a further embodiment of the solenoid valve according to the invention.

FIG. 7 illustrates a second embodiment of a solenoid valve according to the invention and designated by the reference number 200.

In a way similar to the solenoid valve 1, the solenoid valve 200 comprises a first mouth 202 for inlet of a working fluid, and a second mouth 204 and a third mouth 206 for outlet of said working fluid.

Once again with reference to FIG. 1B, the solenoid valve 200 can assume the three operating positions P1, P2, P3 previously described, establishing the hydraulic connection between the mouths 202, 204 and 206 as has been described previously. This means that in the position P1 a passage of fluid from the first mouth 202 to the second mouth 204 and the third mouth 206 is enabled, in the position P2 a passage of fluid from the first mouth 202 to the third mouth 206 is enabled, whilst the passage of fluid from the mouth 202 to the mouth 204 is disabled; finally, in the position P3 the passage of fluid from the mouth 202 to the mouths 204 and 206 is completely disabled.

An electromagnet 208 comprising a solenoid 208a can be driven for causing a switching of the operating positions P1, P2, P3 of the solenoid valve 200, as will be described in detail hereinafter.

With reference to FIG. 7, the solenoid valve 200 comprises a plurality of components coaxial with one another and sharing a main axis H'. In particular, the solenoid valve 200 comprises a jacket 210 housed in which are a first open/close element 212 and a second open/close element 214 and fixed on which is the solenoid 208a, carried by a supporting bushing 209.

Moreover provided on the jacket 210 are the mouths 2, 6, whilst, as will emerge more clearly from the ensuing description, the mouth 4 is provided by means of the open/close element 212.

The jacket 210 is traversed by a through hole sharing the axis H' and comprising a first stretch 216 having a diameter D216 and a second stretch 218 comprising a diameter D218, where the diameter D218 is greater than the diameter D216. In an area corresponding to the interface between the two holes a shoulder 219 is thus created.

The mouths 202, 206 are provided by means of through holes with radial orientation made, respectively, in a position corresponding to the stretch 216 and to the stretch 218 and in communication therewith.

Moreover provided on an outer surface of the jacket 10 are a first annular groove 220, a second annular groove 222, and a third annular groove 224, each designed to receive a gasket of the O-ring type, arranged on opposite sides with respect to the radial holes that define the mouth 202 and the radial holes that define the mouth 206.

In particular, the mouth 206 is comprised between the grooves 222 and 224 whilst the mouth 2 is comprised between the grooves 220 and 222.

Preferably, the three annular grooves 220, 222, 224 are provided with the same seal diameter so as to minimize the unbalancing induced by the resultant of the forces of pressure acting on the outer surface of the jacket 210, which otherwise would be such as to jeopardize fixing of the jacket of the solenoid valve in the corresponding seat provided on a component or in an oleodynamic circuit where it is installed.

The first open/close element 212 is basically configured as a hollow tubular element comprising a stem 226—which is hollow and provided in which is a first cylindrical recess 227—, a neck 228, and a head 230, which has a conical contrast surface 232 and a collar 234. The neck 228 has a diameter smaller than the stem 226.

Moreover, preferably provided in the collar 234 is a ring of axial holes 234A, whilst a second cylindrical recess 235 having a diameter D235 is provided in the head 230.

The stem 226 of the open/close element 212 is slidably mounted within the stretch 216, in such a way that the latter will function as guide element and as dynamic-seal element for the open/close element 212 itself: the dynamic seal is thus provided between the environment giving out into which is the first mouth 202 and the environment giving out into which is the second mouth 4. As has been described previously, this, however, gives rise to slight leakages of fluid through the gaps existing between the open/close element 212 and the stretch 216, contributing to defining the hydraulic consumption of the solenoid valve 200.

The axial length of the stem 226 is chosen in such a way that it will extend along the stretch 216 as far as the holes that define the mouth 202, which are thus in a position corresponding to the neck 228 that provides substantially an annular fluid chamber.

The head 230 is positioned practically entirely within the stretch 218, except for a small surface portion 232 that projects inside the stretch 216 beyond the shoulder 219. In fact, the head 230 has a diameter greater than the diameter D216 but smaller than the diameter D218 so that provided in a position corresponding to the shoulder 19 is a first contrast seat A1' for the open/close element 212, in particular for the conical surface 232.

In a variant of the solenoid valve of FIG. 7, made in a position corresponding to the shoulder 219 is an annular chamfer that increases the area of contact with the conical surface 232 at the same time reducing the specific pressure developed at the contact therewith, hence minimizing the risks of damage to the surface 232. It is in any case important for the seal diameter between the open/close element 212 and the shoulder 219 to be substantially equal to the diameter D216.

Provided at a first end of the jacket 210 is a first threaded recess 236 engaged in which is a bushing 238 comprising a plurality of holes that define the mouth 204. Some of said holes have a radial orientation, whilst one of them is set sharing the axis H'.

The bushing 238 houses a spacer ring 240, fixed with respect to the first open/close element 212, bearing upon which is a first elastic-return element 242 housed within the recess 227. The choice of the band width of the spacer ring 240 enables adjustment of the pre-load of the elastic element 242. Fixed at the opposite end of the jacket 210 is a second bushing 244 having a neck 246 fitted on which is the supporting bushing 209. The bushing 244 constitutes a portion of the magnetic core of the electromagnet 8 and offers a contrast surface to a spacer ring 248 that enables adjustment of the stroke of the first open/close element 212 and functions as contrast surface for the latter against the action of the elastic element 242. In effect, also the bushing 238 functions as contrast for the elastic element 242 in so far as the elastic forces resulting from the deformation of the elastic element are discharged thereon.

The second open/close element 214 is set practically entirely within the bushing 244. In particular, the latter comprises a central through hole 250 that gives out into a cylindrical recess 252, facing the open/close element 212. The open/close element 214 comprises a stem 254 that bears upon a head 256, both of which are coaxial to one another and are set sharing the axis H', where the stem 254 is slidably mounted within the hole 250, whilst the head 256 is slidably mounted within the recess 252. It should be noted that in the embodiment described here the stem 254 simply bears upon the head 256 since—as will emerge more clearly—during operation it exerts an action of thrust (and not of pull) on the head 256, but in other embodiments a rigid connection between the stem 254 and the head 256 is envisaged. The stem 254 is, instead, rigidly connected to the anchor 264.

The head 256 further comprises a conical contrast surface 258 designed to co-operate with a second contrast seat A2' defined by the internal edge of the recess 235.

Set between the head 256 and the bottom of the recess 252 is a spacer ring 260, the band width of which determines the stroke of the second open/close element 214. In addition, the spacer ring 260 offers a contrast surface to the open/close element 214, in particular to the head 256, in regard to the return action developed by a second elastic-return element 262, bearing at one end upon the head 256 and at another end upon the bushing 238. The elastic element 262 is set sharing the axis H' and inside the elastic element 242.

At the opposite end, the stem 254 is rigidly connected to an anchor 264 of the electromagnet 208 that bears upon a spring 266 used as positioning element. The maximum travel of the anchor 266 is designated by c'.

Preferably, the stroke of the anchor 266 is chosen so as to be equal to or greater than the maximum displacement allowed for the open/close element 214.

Operation of the solenoid valve 200 is described in what follows. In the position illustrated in FIG. 7, corresponding to the position P1, the fluid that enters through the holes that define the mouth 202 traverses a first gap existing between the surface 232 and the seat A1' and a second gap existing between the seat A2' and the surface 258, flowing within the first open/close element 212 and coming out from the bushing 238 through the mouth 204. In fact, in the position P1 the open/close elements 212, 214 are kept detached from the respective contrast seats and in contact, respectively, with the bushing 244 and the spacer ring 260, thanks to the action of the respective elastic elements 242, 262.

In traversing the first gap, part of the fluid can come out through the holes that define the third mouth 206, whereas another part of the fluid traverses the holes 234a and proceeds towards the second gap.

To switch the solenoid valve 200 from the position P1 to the position P2, it is sufficient to control the electromagnet 208 so that it impresses on the second open/close element 214 a first movement that brings the latter, in particular the conical surface 258, to bear upon the second contrast seat A2', disabling fluid communication between the first mouth 202 and the second mouth 204. In a way similar to the open/close element 14, the open/close element 214 is hydraulically balanced because the seal diameter, coinciding with the diameter D235 of the contrast seat A2', is substantially equal to the guide diameter, i.e., the diameter of the recess 252.

This means that the force of actuation that must be developed by the electromagnet must overcome substantially just the action of the elastic element 242, remaining practically indifferent to the actions of the pressurized fluid inside the solenoid valve 200.

The aforesaid first movement is imparted to the open/close element 214 by means of circulation, in the solenoid 208a, of a current having an intensity $I_1$ sufficient to displace the anchor 264 of just the distance necessary to bring the open/close element to bear upon the seat A2' and to overcome the resistance of just the elastic element 262.

To switch the solenoid valve 200 into the position P3 from the position P2, it is necessary to increase the intensity of the current circulating in the solenoid 208a up to a value $I_2$, higher than the value $I_1$, such as to impart on the open/close element 214 a second movement overcoming the resistance of both of the elastic elements 242, 262. Said second movement results in the movement (in this case with an action of thrust and not of pull as in the case of the solenoid valve 1) of the first open/close element 212 in conjunction with the second open/close element 214 up to the position in which the first open/close element (thanks to the conical surface 232) comes to bear upon the seat A1', disabling the hydraulic connection between the mouths 2 and 4.

Also the open/close element 214 is hydraulically balanced since the seal diameter, i.e., the diameter of the contrast seat A2', is equal to the diameter of the recess 252 in which the head 256 is guided and slidably mounted.

During the second movement, the second open/close element 214 remains in contact against the first open/close element 212 keeping the hydraulic connection between the mouths 202 and 206 closed.

There moreover apply the considerations on the various alternatives for connection of the mouths 202, 204, and 206 to environments with different levels of pressure, and the considerations set forth for the solenoid valve 1 apply in the case where also the solenoid valve 200 is used in an ABS. Nevertheless, it is also possible to use dynamic-seal rings in the case where the solenoid valve 200 is used with gaseous fluids.

What is claimed is:

1. A solenoid valve comprising three mouths and three operating positions, wherein said three mouths comprise:
    a first mouth for inlet of a working fluid; and
    a second mouth and a third mouth for outlet of the working fluid, and wherein said three operating positions comprise:
        a first operating position, in which a passage of fluid from said first mouth to said second mouth and third mouth is enabled,
        a second operating position, in which a passage of fluid from said first mouth to only one of said second and third mouths is enabled, and
        a third operating position, in which the passage of fluid from the first mouth to the second mouth and the third mouth is disabled,
    said solenoid valve further comprising an electromagnet that can be controlled to cause a switching of the operating position,
    wherein the solenoid valve comprises a first open/close element and a second open/close element co-operating, respectively, with a first contrast seat and a second contrast seat, wherein said first open/close element and said first contrast seat are provided for controlling the passage of fluid from said first mouth to said third mouth, and wherein said second open/close element and said second contrast seat are provided for regulation of the passage of fluid from said first mouth to said second mouth, and
    wherein said solenoid can be actuated for impressing on said second open/close element:
        a first movement whereby said second open/close element is brought into contact with said second contrast seat disabling the passage of fluid from said first mouth to said second mouth providing a switching from said first operating position to said second operating position,
        a second movement, subsequent to said first movement, whereby said second open/close element moves said first open/close element against said first contrast seat disabling the passage of fluid from said first mouth to said third mouth and providing a switching from said second operating position to said third operating position,
    wherein during said second movement the second open/close element is in contact with said second contrast seat,
    wherein said first open/close element and second open/close element are coaxial to one another and hydraulically balanced,
    wherein the solenoid valve comprises a jacket slidably mounted within which is said first open/close element,
    wherein said first mouth, second mouth, and third mouth of said solenoid valve are provided on said jacket, and
    wherein said first contrast surface is provided on said jacket and said second contrast surface is provided on said first open/close element.

2. The solenoid valve according to claim 1, wherein said jacket is traversed by a through hole comprising a first stretch and a second stretch, wherein said first stretch has a diameter smaller than a diameter of said second stretch, and wherein said first open/close element comprises a stem slidably mounted and guided in said first stretch and a head comprising a conical contrast surface designed to co-operate with said first contrast seat, said first contrast seat being provided in an area corresponding to a shoulder between said first stretch and said second stretch.

3. The solenoid valve according to claim 2, wherein said stem has a diameter equal to a diameter of said first contrast seat.

4. The solenoid valve according to claim 3, wherein the head of said first open/close element comprises a cylindrical recess that provides said second contrast seat for said second open/close element.

5. The solenoid valve according to claim 4, wherein the stem of said first open/close element comprises a further cylindrical recess housed in which is a first elastic-return element designed to co-operate with said first open/close element, said first elastic-return element moreover contrasting against a spacer ring fixed with respect to said first open/close element.

6. The solenoid valve according to claim 1, wherein said second open/close element is set within said first open/close element and is mobile with respect thereto.

7. The solenoid valve according to claim 6, wherein said second open/close element comprises: a terminal shank, set at a first end thereof, constrained to which is an anchor co-operating with said solenoid, a head having a conical contrast surface designed for contact with said second contrast seat and set at a second end thereof, and a stem set between and connecting said shank and said head.

8. The solenoid valve according to claim 7, wherein the stem of said second open/close element comprises a hole coaxial thereto intersected by a first set of radial holes and a second set of radial holes, said first set of radial holes being in fluid communication with said second mouth of said solenoid valve.

9. The solenoid valve according to claim 7, wherein the head of said second open/close element is guided in a central through hole of a guide bushing set at a second end of said jacket, said guide bushing and the head of said second open/close element defining said second mouth of said solenoid valve.

10. The solenoid valve according to claim 9, wherein said central through hole of said guide bushing has a diameter equal to a diameter of said second contrast seat.

11. The solenoid valve according to claim 7, wherein the solenoid valve comprises a second elastic-return element designed to co-operate with said second open/close element.

12. The solenoid valve according to claim 11, wherein the solenoid valve comprises a cup constrained to said jacket in a position corresponding to said first end and housing said solenoid, set in an annular recess inside a toroid, and a plug bearing on said toroid and constrained to said cup, in said plug and said toroid there being defined a cavity housed in which is said second elastic-return element.

13. The solenoid valve according to claim 5, wherein said jacket comprises a first bushing and a second bushing, fixed, respectively, at a first end and a second end thereof, wherein said first bushing comprises a plurality of holes defining said second mouth and defines a contrast for the first elastic-return element associated to said first open/close element and for a second elastic-return element associated to said second open/close element.

14. The solenoid valve according to claim 13, wherein said second open/close element comprises a head slidably mounted in a cylindrical recess provided in said second bushing and a stem slidably mounted in said second bushing.

15. The solenoid valve according to claim 14, wherein the said second contrast seat has a diameter equal to a diameter of said cylindrical recess of said second bushing.

16. The solenoid valve according to claim 14, wherein said electromagnet comprises an anchor connected to the stem of said second open/close element and housed in a supporting bushing for a solenoid of said electromagnet fixed to said second bushing.

* * * * *